United States Patent Office 3,455,655
Patented July 15, 1969

3,455,655
DETECTION OF MISSILE FUELS IN
GAS ATMOSPHERE
Charles A. Plantz and David G. Hannan, Pittsburgh, Pa., assignors to Mine Safety Appliances Company, Pittsburgh, Pa., a corporation of Pennsylvania
No Drawing. Filed June 1, 1965, Ser. No. 460,479
Int. Cl. G01n 29/02, 7/14
U.S. Cl. 23—232                                      11 Claims A variety of volatile nitrogen compounds are used as components of missile fuels, examples being hydrazine, hydrazine hydrate, red fuming nitric acid (RFNA), and substituted hydrazines, for example volatile alkyl hydrazines such as methyl and ethyl hydrazines, and unsymmetrical dimethyl hydrazine (UDMH). Various hazards are attendant upon the fueling, handling and storing of missiles propelled by such liquids for which reason it is important that means be available for prompt detection of the presence of those and related volatile nitrogen compounds in air or other atmospheres where they may be present at missile facilities and elsewhere.

It is among the objects of this invention to provide a simple, rapid and reliable method of detecting the presence of the said volatile nitrogen compounds in gases, particularly air, that may be practiced by non-technical persons, that is rapid, is satisfactory for plant, field and laboratory use, and that requires only simple, inexpensive and readily available materials and apparatus.

Another object is to provide a reagent for practicing the foregoing method that is readily and easily prepared from standard commercially available and inexpensive materials.

The invention is predicated upon our discovery that when air or other gas containing the aforesaid volatile nitrogen compounds is passed into contact with a composition of a hexavalent chromium compound and a pentavalent phosphorus acid on a carrier inert to those two reagents a characteristic and readily observable color change occurs promptly.

The carrier, preferably a granular adsorbent, does not enter into the color-producing reaction but serves merely as an inert physical carrier for the reagent, thus avoiding the necessity for liquid reagents with their attendant disadvantages. Among the various carriers that might be used is HCl-purified silica gel which, being colorless, insures maximum intensity of the color change.

In the presence of the aforesaid volatile nitrogen compounds the reagent of this invention undergoes a color change; thus UDMH causes a change from yellow-orange to green or blue with the contrast between the unaffected reagent and that altered by the nitrogen compound being clearly evident and vivid. Metaphosphoric acid unexpectedly gives this intense color change, much more so than other acids such as sulfuric acid, boric acid or perchloric acid.

The hexavalent chromium compound may be supplied as chromium trioxide ($CrO_3$) or as a soluble chromate or dichromate, e.g., potassium (or other alkali metal) chromate ($K_2CrO_4$) or dichromate ($K_2Cr_2O_7$). The phosphoric acid may be orthophosphoric acid ($H_3PO_4$) or metaphosphoric acid ($HPO_3$) or other acid of pentavalent phosphorus.

The two constituents of the reagents may be used in such proportions as to provide per 100 ml. of silica gel about 0.022 gm. to 24 gms. of pentavalent phosphorus and about 0.0145 gm. to 2.6 gms. of hexavalent chromium.

The most vivid color change contrast in the case of these nitrogen compounds is to be had by the use of about 0.05 gm. to 3 gms. of chromium trioxide and from about 0.15 gm. to 9 gms. of metaphosphoric acid per 100 milliliters of silica gel, most suitably of 8 to 14 mesh size, with the preferred proportions being 0.53 gm. of chromium trioxide and 1.67 gms. of metaphosphoric acid.

The reagent may be prepared satisfactorily by addition of the reagents in the foregoing proportions to about 16 milliliters of water and mixing the silica gel with the solution. When a relatively coarse silica gel is used, say of about 8 to 14 mesh, the introduction of water causes it to break down into particles finer than are desirable for the purposes of the invention. This may be avoided by using silica gel that has been humidified by exposure to humid air. The impregnated silica gel is then vacuum dried until it is free flowing, preferably to a water content of about 10 to 12 percent by weight.

Satisfactory response of the reagent to the presence of these volatile nitrogen compounds is had by passing the atmosphere, as by an aspirator bulb or a fixed flow rate pump, such as that described in U.S. Patent 3,166,938 to Weyrauch et al., to be tested through the reagent confined in a container having a transparent portion through which the reagent may be viewed. When used with gas mask canisters a satisfactory way for the protection of personnel resides in the use of canisters of the gas mask type such as are shown in Patent No. 1,537,519 to M. Yablick, as well as in various other patents. If the canister fill is not of this reagent it suffices to position a thin layer of the reagent against the canister window. In the presence of most of these volatile nitrogen compounds the color change is visible through the canister window beginning at the inlet end of the canister and progressing toward the outlet end as the reagent is progressively reacted. Thus the position of the color front gives an immediate indication of the degree of exhaustion of the canister, and when the color change has occurred up toward the outlet it is evident that the discard point has been reached. In the case of RFNA, however, the color change does not present a moving front but rather the whole gel area darkens progressively on exposure.

Alternatively, for spot checks the reagent may be disposed in a glass or other transparent tube of small diameter the ends of which are sealed as described in U.S. Patent 2,174,349 to John B. Littlefield. The reagent tube is used by breaking the seals and passing the atmosphere to be tested through it. Appearance of the color change indicates, of course, the presence of one of the volatile nitrogen compounds.

Color standards for comparison with the color change may be provided in the manner known in this general testing field.

Because RFNA is a solution of nitrogen dioxide ($NO_2$) in nitric acid it is clear that the invention provides also for the detectiton of $NO_2$.

Desirably the test containers are dried at 250° C. for a few hours, then filled with the reagent and promptly sealed.

Changes in water vapor content of the air (20 to 80% RH) being tested do not interfere with the results. Likewise, such organic compounds as acetone, benzene and hexane do not interfere. And the results are acceptably independent at from 70° to 100° F. The stain may have a light end point when first formed but after about two minutes the stain intensity increases to give a clear end point. Tests have shown that when protected from the atmosphere the reagents of this invention may be expected to have a shelf life of about two years.

Although the invention has been described with particular reference to silica gel as the reagent carrier it will be understood that other substances may be used such as alumina, glass cloth, filter paper, and the like.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. In a method of detecting a volatile nitrogen compound of the group consisting of hydrazine, hydrazine hydrate, red fuming nitric acid (RFNA), unsymmetrical dimethyl hydrazine (UDMH) and alkyl hydrazines in a gas, the step consisting of passing the gas, to be tested for the presence of said compound, into contact with a reagent consisting essentially of a soluble hexavalent chromium compound and a pentavalent phosphoric acid supported by an inert carrier and providing from 0.0145 gram to 2.6 grams of hexavalent chromium and from 0.022 gram to 24 grams of pentavalent phosphorus per 100 milliliters of carrier, the reagent undergoing a color change in the presence of said compound.

2. A method according to claim 1, said reagent consisting essentially of chromium trioxide and metaphosphoric acid supported by silica gel in the proportions of about 0.15 gram to 3 grams of chromium trioxide and from about 0.15 to 9 grams of metaphosphoric acid.

3. A method according to claim 1, the reagent having a water content of about 10 to 12 percent by weight.

4. A method according to claim 2, the reagent consisting of chromium trioxide and metaphosphoric acid in the proportion of 0.53 gram of the former to 1.67 grams of the latter.

5. A reagent for detecting a volatile nitrogen compound of the group consisting of hydrazine, hydrazine hydrate, RFNA, UDMH, and alkyl hydrazines in a gas, consisting essentially of a hexavalent chromium compound and a pentavalent phosphoric acid supported by an inert carrier, the reagent undergoing a color change upon contact with said compound.

6. A reagent for detecting a volatile nitrogen compound of the group consisting of hydrazine, hydrazine hydrate, RFNA, UDMH, and alkyl hydrazines in a gas, the reagent consisting essentially of a soluble hexavalent chromium compound and a pentavalent phosphoric acid supported by silica gel in proportions to provide about 0.0145 gram to 2.6 grams of hexavalent chromium and from about 0.022 to 24 grams of pentavalent phosphoric acid per 100 milliliters of silica gel the reagent undergoing a color change upon contact with said compound.

7. A reagent according to claim 6, consisting essentially of chromium trioxide and metaphosphoric acid supported by silica gel in the proportions of about 0.15 gram to 3 grams of chromium trioxide and from about 0.15 to 9 grams of metaphosphoric acid, the reagent having a water content of about 10 to 12 percent by weight and undergoing a color change upon contact with said compound.

8. A reagent according to claim 7, the chromium trioxide and metaphosphoric acid being present in the proportions of 0.53 gram of the former to 0.67 gram of the latter.

9. A gas detection device comprising a casing provided with sealed inlet and outlet openings and having disposed therein a body of a reagent for detecting a volatile nitrogen compound of the group consisting of hydrazine, hydrazine hydrate, RFNA, UDMH, and alkyl hydrazines in a gas, consisting essentially of a hexavalent chromium compound and a pentavalent phosphoric acid supported by an inert carrier, the reagent undergoing a color change upon contact with said compound.

10. A gas detection device comprising a casing provided with sealed inlet and outlet openings and having disposed therein a body of a reagent for detecting a volatile nitrogen compound of the group consisting of hydrazine, hydrazine hydrate, RFNA, UDMH, and alkyl hydrazines in a gas, the reagent consisting essentially of a soluble hexavalent chromium compound and a pentavalent phosphoric acid supported by silica gel in proportions to provide about 0.0145 gram to 2.6 grams of hexavalent chromium and from about 0.022 to 24 grams of pentavalent phosphoric acid per 100 milliliters of silica gel the reagent undergoing a color change upon contact with said compound.

11. A gas detection device comprising an elongate transparent tubular member having disposed therein a body of a reagent for detecting a volatile nitrogen compound of the group consisting of hydrazine, hydrazine hydrate, RFNA, UDMH, and alkyl hydrazines in a gas, the reagent consisting essentially of a soluble hexavalent chromium compound and a pentavalent phosphoric acid supported by silica gel in proportions to provide about 0.0145 gram to 2.6 grams of hexavalent chromium and from about 0.022 to 24 grams of pentavalent phosphoric acid per 100 milliliters of silica gel the reagent undergoing a color change upon contact with said compound, the ends of said member being sealed.

References Cited

UNITED STATES PATENTS 3,131,030   4/1964   Grosskopf _____ 23—254

OTHER REFERENCES

Garcia, F. C., and Garrido, M. L., Chem. Abstr. 50, 12737g (1956).

Merck Index, seventh ed., pp. 809–810.

MORRIS O. WOLK, Primary Examiner

R. M. REESE, Assistant Examiner

U.S. Cl. X.R.

23—254